US008567112B2

(12) United States Patent
Tikalsky

(10) Patent No.: US 8,567,112 B2
(45) Date of Patent: Oct. 29, 2013

(54) METHOD AND APPARATUS FOR CONTROLLING BURROWING ANIMALS

(75) Inventor: John M. Tikalsky, Discovery Bay, CA (US)

(73) Assignee: Amerigreen Technology, Inc., Discovery Bay, CA (US)

( * ) Notice: Subject to any disclaimer, the term of this patent is extended or adjusted under 35 U.S.C. 154(b) by 202 days.

(21) Appl. No.: 12/901,856

(22) Filed: Oct. 11, 2010

(65) Prior Publication Data

US 2012/0087736 A1 Apr. 12, 2012

(51) Int. Cl.
*A01M 17/00* (2006.01)
*A01M 99/00* (2006.01)
*A01M 11/00* (2006.01)
*A01M 23/00* (2006.01)

(52) U.S. Cl.
USPC .......... 43/124

(58) Field of Classification Search
USPC .......... 43/1, 58, 124, 125, 129, 132.1; 405/267, 53
See application file for complete search history.

(56) References Cited

U.S. PATENT DOCUMENTS 2,598,352 A * 5/1952 Cassell .......... 43/124
3,473,252 A * 10/1969 Kramer et al. .......... 43/124
4,597,217 A 7/1986 Narita
4,833,818 A 5/1989 Berta
5,141,365 A * 8/1992 Smart .......... 405/267
5,690,448 A 11/1997 Fasullo et al.
6,558,684 B1 5/2003 Sutherland
6,966,144 B2 11/2005 Eliasson et al.
7,273,108 B2 9/2007 Misselbrook
7,472,512 B2 * 1/2009 Chang et al. .......... 43/132.1
2006/0107978 A1 * 5/2006 Saik .......... 134/166 R
2007/0125508 A1 * 6/2007 McVane .......... 164/15

OTHER PUBLICATIONS

Wikipedia, "Smoke Testing", 2007.*
Sebag, et al. The Natural hydrous sodium silicates from the northern bank of Lake Chad: occurrence, petrology and genesis, 2001.*

* cited by examiner

*Primary Examiner* — Darren W Ark
*Assistant Examiner* — Thien Thanh Pham
(74) *Attorney, Agent, or Firm* — Fitzpatrick, Cella, Harper & Scinto

(57) ABSTRACT

In a method of controlling burrowing animals, a slurry of a natural soil component and water is generated. The slurry is pumped into a tunnel and den system dug by the burrowing animal until the tunnel and den system is filled by the slurry. An apparatus for controlling burrowing animals includes a first tank that contains water. A second tank contains a natural soil component. A water pump pumps water from the water tank into the second tank. A plurality of nozzles receives water from the water pump and sprays water from the water tank into the bottom portion of the second tank, so as to generate a slurry of a natural soil component and water. A slurry pump is configured to pump the slurry. A slurry hose is configured to delivery the slurry from the slurry pump into a tunnel and den system dug by a burrowing animal.

8 Claims, 3 Drawing Sheets

130
22
114
22
10
20
120
114
22

METHOD AND APPARATUS FOR CONTROLLING BURROWING ANIMALS

BACKGROUND OF THE INVENTION

1. Field of the Invention

The present invention relates to methods for controlling burrowing animals.

2. Description of the Related Art

Burrowing animals, such as gophers, ground squirrels and the like, live underground in tunnels. Burrows made by such animals can cause substantial harm to landowners. For example, when a horse steps in a hole made by a burrowing animal, it can break its ankle In many cases, the burrows are unsightly and interfere with human activity. For example, burrows on golf courses detract from the aesthetics of the course and can cause damage to golf carts. Burrowing animals also cause substantial damage to crops and farm structures.

Depending on the type of burrowing rodent, an individual burrow can be 5 to 30 feet or more in length. Burrow sizes may range from 1 to 18 cubic feet. Some are short tunnels, but others have many branches and often with two or more openings to the above ground surface. The tunnels are interconnected and lead to small and very large dens. The rodents construct nests of finely shredded grass or other materials in these underground dens. The dens are located on off shoot globular chambers slightly above and to one side of the main runway and tucked back in the burrow. The nests are a safe haven to the rodents Most burrowing animals are rodents that reproduce at a high rate. Most such rodents have several litters each year and each litter produces numerous offspring. The gestation period of ground squirrels is 25 to 30 days and the normal litter is between 1 and 15. Also, ground squirrels may live five years or more in the wild.

The ground squirrel feeds chiefly on green herbage and the damage to truck crops, grain, nuts, or fruit crops from such animals each year is extensive. Ground squirrels significantly reduce the amount of green forage available to livestock. Most visible damage occurs when squirrels feed on the tender young sprouts of garden plants, grains of all types, landscape bushes, the fruit & nut tree roots of almonds, apples, apricots, peaches, pistachios, plumbs, oranges, tomatoes, walnuts and grape vineyard plant roots. Young orchards are damaged by the rodents gnawing on the bark of the young trees. Vegetables and field crops such as sugar beets, alfalfa, and cotton are eaten at the seedling stage. Rodents leave excrement and urine as they move through the fields and orchards contaminating the crops and creating a health concern to consumers. Burrowing Rodents also carry fleas, lice and diseases which are transferred to domestic animals and can spread throughout a property infecting humans as well. In addition to gnawing on young tree bark the burrowing rodent chew on plastic sprinkler heads and irrigation lines.

One of the most common methods for controlling burrowing animals is to poison them. Anticoagulants and other poisons used in bait stations, spot baiting and broadcast baiting requires repeated treatments However, such poisons have many disadvantages. For example, they are slow acting poisons, often requiring 5 to 15 days to take effect. During that time many ranch animals, family pets and unintended wild life can consume the poisoned rodent, slowly killing the animal that eats it. Use of toxic chemicals is unacceptable to any type of organic gardening. The Toxic Chemicals used in rodent Poisons are dangerous to the people and their families who store, use and handle them. Poison used to control burrowing rodents contaminates our ground water. Also, Poison bait will be ingested by other wild life and domestic animals causing death. Rodents killed with poison do not necessarily die in their burrows and their carcasses are often eaten by other wildlife such as eagles, red-tailed hawks, coyotes, fox, ranch or farm animals and domestic family pets.

Traps are also used to control rodents. However, many states require a trapping license to trap animals. It is also unlawful to transport and release many rodents without a permit, as doing so introduces such rodents to other environments.

Current methods of controlling burrowing animals include: poisoning, trapping, flooding, explosives and explosive gases. Poisoning burrowing animals is disadvantageous for several reasons including: poisoned rodents that die above ground are often eaten by birds, which become poisoned by eating the rodents; poisons set out for rodents might be consumed by other animals, such as pets; poisons harm the environment; and, even though a rodent is killed by a poison, its burrow still remains and can be re-inhabited by other rodents at a later date. Trapping prolongs the animals suffering, and there is a potential of trapping the wrong animal. Also, burrowing rodents avoid traps as a result of having seen trappe fellow rodents. Flooding does not work because other burrowing rodents will re-inhabit borrows as soon as the water is absorbed by the ground. Explosives and explosive gases are inherently dangerous to humans; often these explosives and gases ignite the surrounding grasses and fields causing the potential for deadly fire damage to property and animals in the area. Another problem with explosives is that they require highly trained people to handle such hazardous and flammable materials.

Therefore, there is a need for controlling burrowing animals that prevents reinhabitation of burrows by other animals.

SUMMARY OF THE INVENTION

The disadvantages of the prior art are overcome by the present invention which, in one aspect, is a method of controlling burrowing animals, in which a slurry of a natural soil component and water is generated. The slurry is pumped into a tunnel and den system dug by the burrowing animal until the tunnel and den system is filled by the slurry.

In another aspect, the invention is a method of controlling burrowing rodents, in which locations of all holes connected to a tunnel system inhabited by a burrowing rodent are detected by placing a smoke generating device into the tunnel system and marking a location of each of a plurality of smoke plumes emanating from each of the holes. A slurry of sand and water is generated. The slurry is pumped into each of the holes connected to the tunnel and den system until the tunnel and den system is filled by the sand.

In yet another aspect, the invention is an apparatus for controlling burrowing animals that includes a first tank configured to contain water. A second tank is configured to contain a natural soil component. The second tank has a bottom portion. A water pump is configured to pump water from the water tank into the second tank. A plurality of nozzles is configured to receive water from the water pump and to spray water from the water tank into the bottom portion of the second tank, so as to generate a slurry of a natural soil component and water. A slurry pump is configured to pump the slurry. A slurry hose is configured to delivery the slurry from the slurry pump into a tunnel and den system dug by a burrowing animal.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
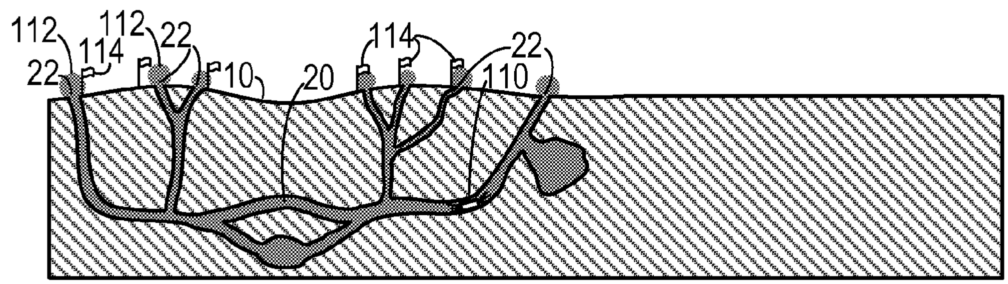
FIGS. 1A-1D are a series of schematic diagrams demonstrating one method of controlling burrowing animals.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1A, a ground surface 10 has a burrowing animal tunnel system 20 that opens to a plurality of burrow holes 22. To locate each burrow hole 22 that is connected to the tunnel 20 system, a smoke generating device 110 is placed into the tunnel system 20 through one of the burrow holes. This generates a plurality of smoke plumes 112 emanating from each of the burrow holes 22. A marker 114 (such as a construction flag, or the like) is placed next to each smoke plume 112 near the corresponding burrow hole 22.

Figure 1B:
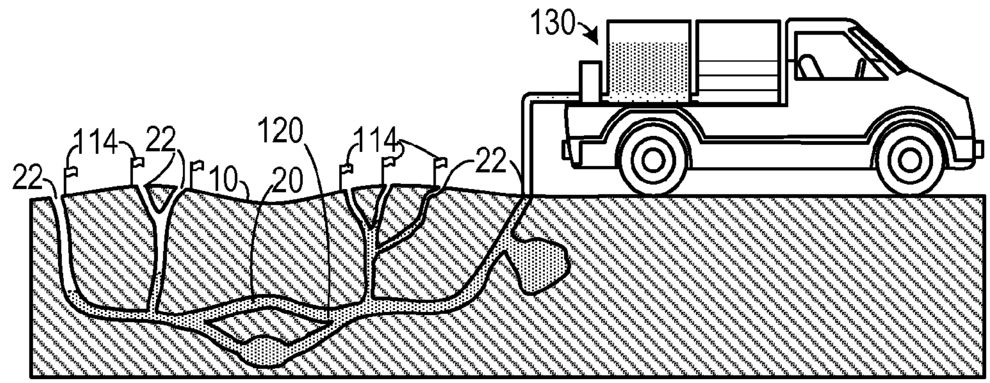
Figure 1C:
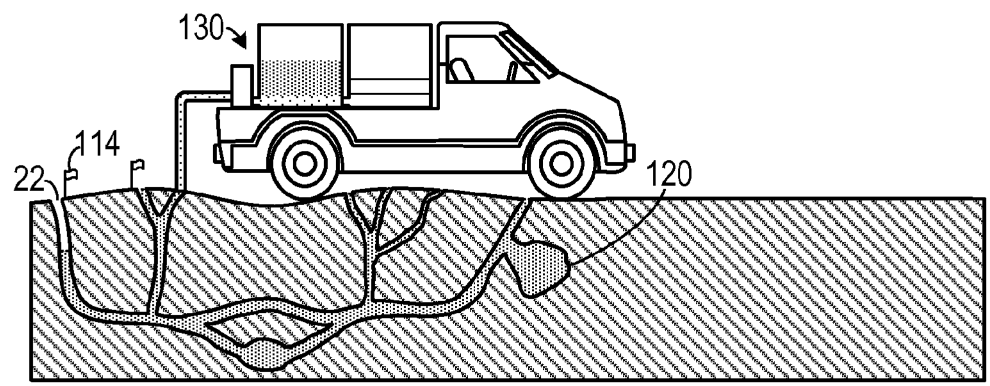
Figure 1D:
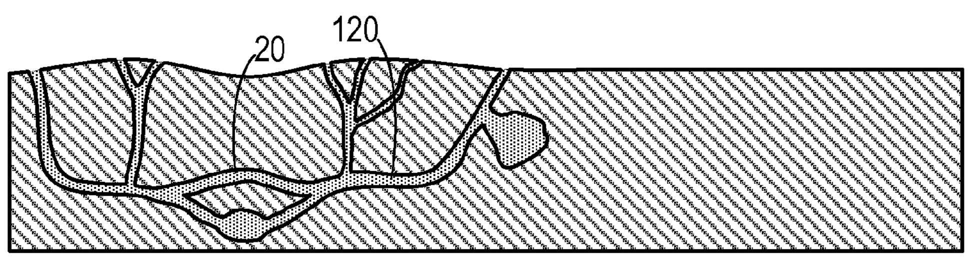

As shown in FIG. 1B, once each burrow hole 22 is marked, a slurry generating and pumping system 130 pumps a slurry of a natural soil component into a first one of the burrow holes 22, thereby filling the tunnels 20 and dens with the natural soil component. In one embodiment, the natural soil component is sand. However, other natural soil components may be used, depending on the nature of the ground and the availability of components. Examples of suitable natural soil components include: sand, clay, humus, compost, manure, wood chips, gravel and combinations thereof. As shown in FIG. 1C, the slurry is pumped into each burrow hole 22 until the entire tunnel and den system 20 is filled, which is shown in FIG. 1D.

Figure 2:
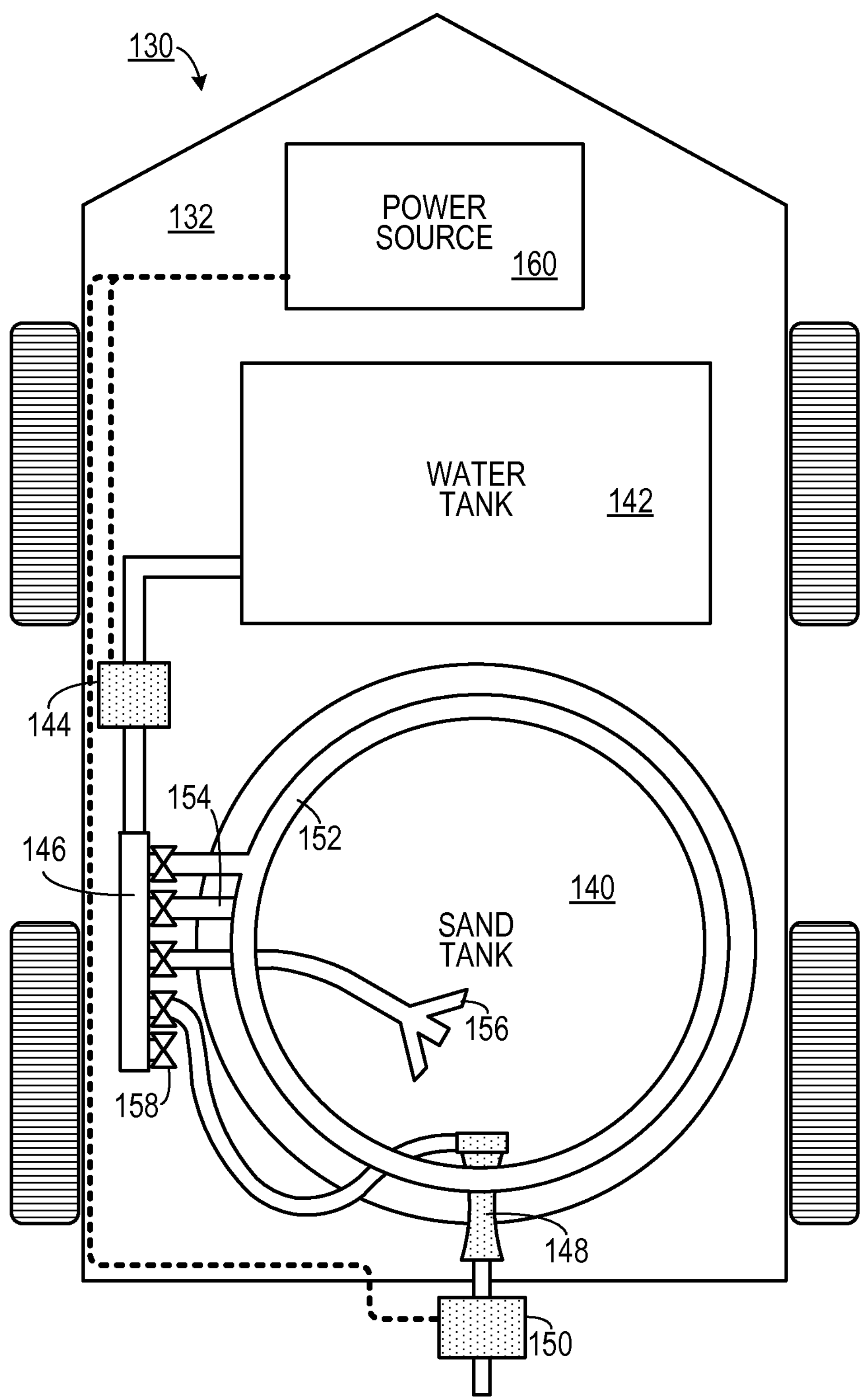
FIG. 2 is a top plan view of one embodiment of a system for generating a slurry used to fill in a tunneling system.

One representative embodiment of a slurry generating and pumping system 130 is shown in FIG. 2. The embodiment shown is mounted on a trailer 132. However, other embodiments can be truck mounted or mounted on any platform capable of delivering the slurry to a desired tunnel system. This embodiment includes a sand tank 140 that is in communication with a water tank 142 through a water pump 144 coupled to a water manifold 146. The water manifold includes a plurality of water spigots including a first one to a first water spray loop 152 disposed inside the sand tank 140 that is configured to spray water upwardly at the sand inside the sand tank 140. A second water loop 154 is coupled to the manifold 146 and is configured to spray water in a downward direction at the sand. A dispersing sprayer 156 sprays water toward the intake input of a venturi pump 148. This water drives the slurry of the sand (or other natural soil component) into the venturi pump 148 intake. A booster pump 150 may be used to move the slurry into the burrow hole. Both the water pump 144 and the booster pump 150 are powered by a power source, which could include a battery, a generator or even a power line from a utility power outlet. An additional spigot 158 is provided for a spray-down hose (not shown) that may be used for cleaning. The water pump In one embodiment, the water tank 142 has a capacity of 200 gallons and the sand tank 140 has a capacity of one cubic yard. It will be readily appreciated that other capacities may be used, depending on the specific application.

Figure 3:
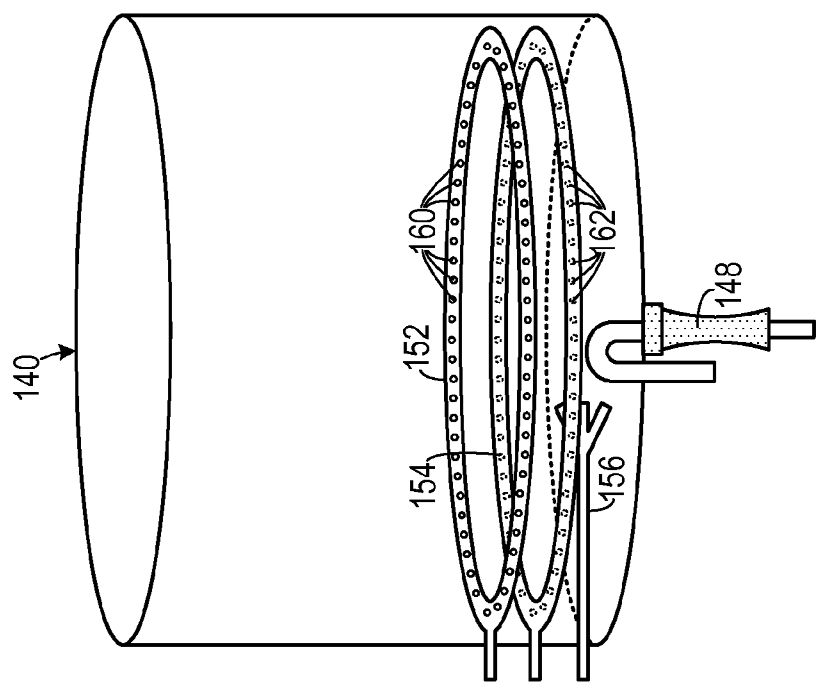
FIG. 3 is a schematic diagram of one embodiment of a sand tank.

As shown in FIG. 3, the first water spray loop 152, which can be constructed from copper tubing, PVC, and the like, includes a first plurality of holes 160 that direct water spray in an upward direction. Similarly, the second water spray loop 154 includes a second plurality of holes 162 that direct water spray in an downward direction. The combination of the spray from the first water spray loop 152, the second water spray loop 154 and the dispersing sprayer 156 creates the slurry, which is pumped out of the tank by the venturi pump 148.

Figure 4:
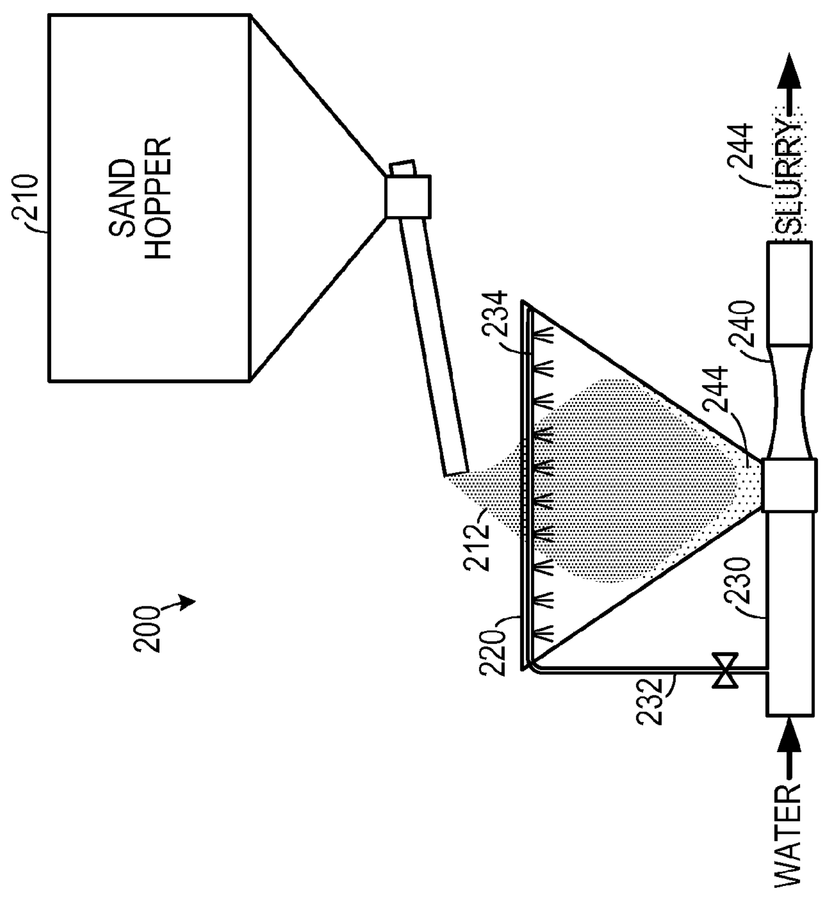
FIG. 4 is a schematic diagram of a hopper eductor system.

As shown in FIG. 4, a hopper-eductor slurry delivery system 200 may be used to deliver the soil component to the burrows. Such as system includes a soil component hopper 210 that stores the soil component to be pumped into the burrows. This hopper delivers the soil component 212 to a mixing funnel 220 that feeds into a venturi pump 240. Water from the water tank is tapped of to a valve-controlled feed line 234, which feeds water to a water spray loop 234 within the mixing funnel 220. Water from the water spray loop 234 mixes with the soil component 212 to form the slurry 244, which gets pumped out by the venturi pump 240 for subsequent delivery to the burrow.

In one embodiment it was found that a mixture of 50% sand and 50% water worked well. In another embodiment a mixture of 10% sand and 90% water worked well. It has been found that when the slurry includes sand and water in a ratio that includes sand in a range of 10% to 50% and water in a range of 90% to 50%, the slurry pumps well. In pumping, the slurry is pumped into the burrow hole until the sand level is flush with the ground surface. Then each subsequent hole is filled until all of the holes are filled with sand. This results in a relatively smooth ground surface.

Once the slurry is pumped into the tunnel system, the water in the slurry is absorbed in the soil and the sand is left to fill and block the tunnels and dens of the tunnel system. This traps the burrowing rodents in the tunnel system, thereby killing it and its offspring, and seals off its food supply that would otherwise be available to other rodents. The filling and sealing of the tunnels and dens reduces re-infestation into the same system by new burrowing rodents, as rodents from other areas cannot merely occupy an unoccupied tunnel system, but they must start burrowing from scratch. Since the slurry is made from a natural soil component, the pumping of the slurry into the tunnel system poses no harm to the environment.

This invention offers many advantages, including the fact that all material components of the method are organic and are naturally found associated with the soil in which the tunnel system resides. No hazardous chemicals contaminate the earth, ground water or crops and no poisons are used, which can kill unintended wild life, domestic animals or family pets. The rodent burrows are completely filled in to eliminating the tunnels, dens, and food storage chambers. Rodents in the tunnels and nests with their off spring are completely buried and unable to resurface. As such, the rodents are killed quickly and humanely. The burrow hole is filled in, and is no longer available to other rodents to occupy. The surface of a pasture is solid and does not present a danger to horses and their riders. It is also economical to use.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of controlling burrowing animals, comprising the steps of:

a. generating a slurry consisting of sand and water; and b. pumping the slurry into a tunnel and den system dug by a burrowing rodent until the tunnel and den system, with the burrowing rodent therein, is filled by the slurry.

2. The method of claim 1, further comprising the step of detecting locations of all holes connected to the tunnel prior to the pumping step.

3. The method of claim 2, wherein the detecting step comprises the steps of:

a. placing a smoke generating device into the tunnel;

b. observing locations of holes from which the smoke escapes; and c. marking each hole from which the smoke escapes.

4. The method of claim 1, wherein the slurry generating step comprises the step of spraying water into a bottom portion of a tank containing the sand so as to form the slurry.

5. The method of claim 1, wherein the slurry comprises the sand and water in a ratio that includes sand in a range of 10% to 50% and water in a range of 90% to 50%.

6. A method of controlling burrowing rodents, comprising the steps of:

a. detecting locations of all holes connected to a tunnel and den system inhabited by a burrowing rodent by placing a smoke generating device into the tunnel system and marking a location of each of a plurality of smoke plumes emanating from each of the holes;

b. generating a slurry consisting of sand and water; and c. pumping the slurry into each of the holes connected to the tunnel system until the tunnel and den system, with the burrowing rodent therein, is filled by the sand.

7. The method of claim 6, wherein the slurry generating step comprises the step of spraying water into a bottom portion of a tank containing the sand so as to form the slurry.

8. The method of claim 6, wherein the slurry comprises the sand and water in a ratio that includes sand in a range of 10% to 50% and water in a range of 90% to 50%.

* * * * *